July 28, 1953 — C. FIELD — 2,646,594
EXTRUSION APPARATUS AND METHOD
Filed Dec. 31, 1948 — 8 Sheets-Sheet 1

INVENTOR.
CROSBY FIELD
BY
ATTORNEYS.

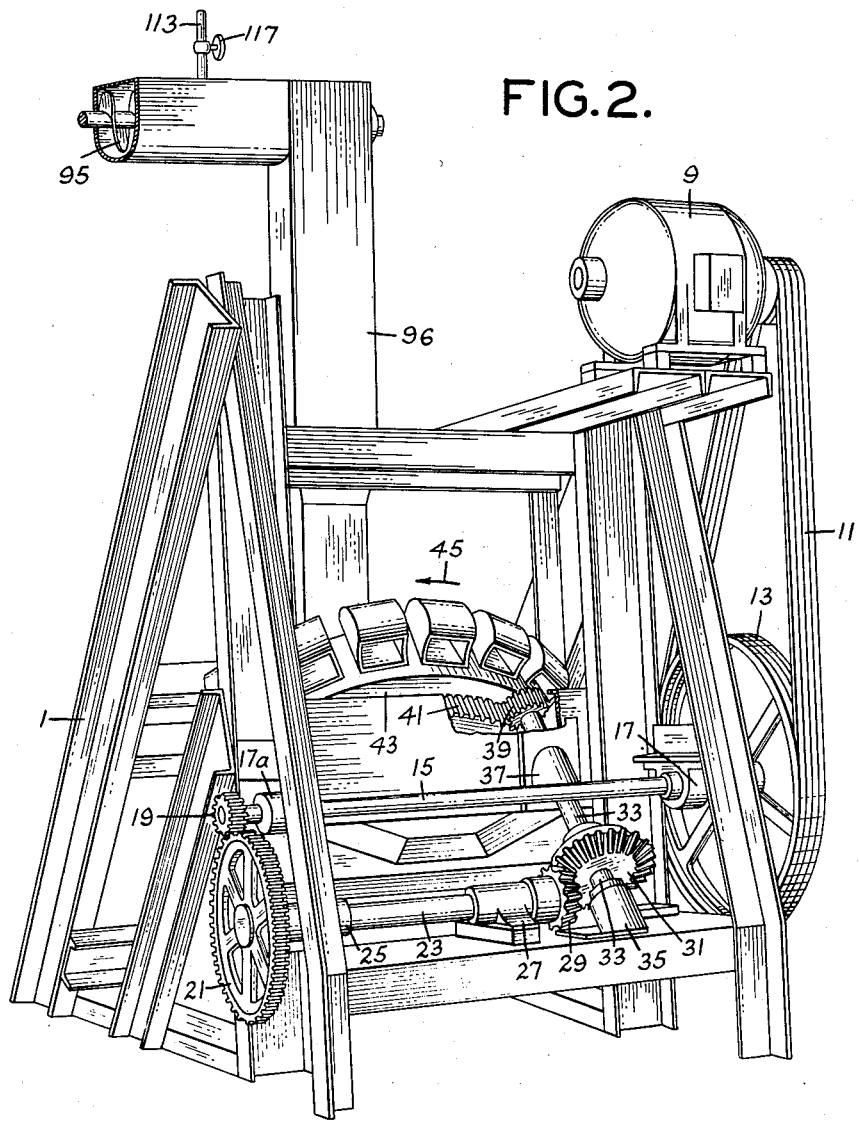

July 28, 1953  C. FIELD  2,646,594
EXTRUSION APPARATUS AND METHOD
Filed Dec. 31, 1948  8 Sheets-Sheet 3
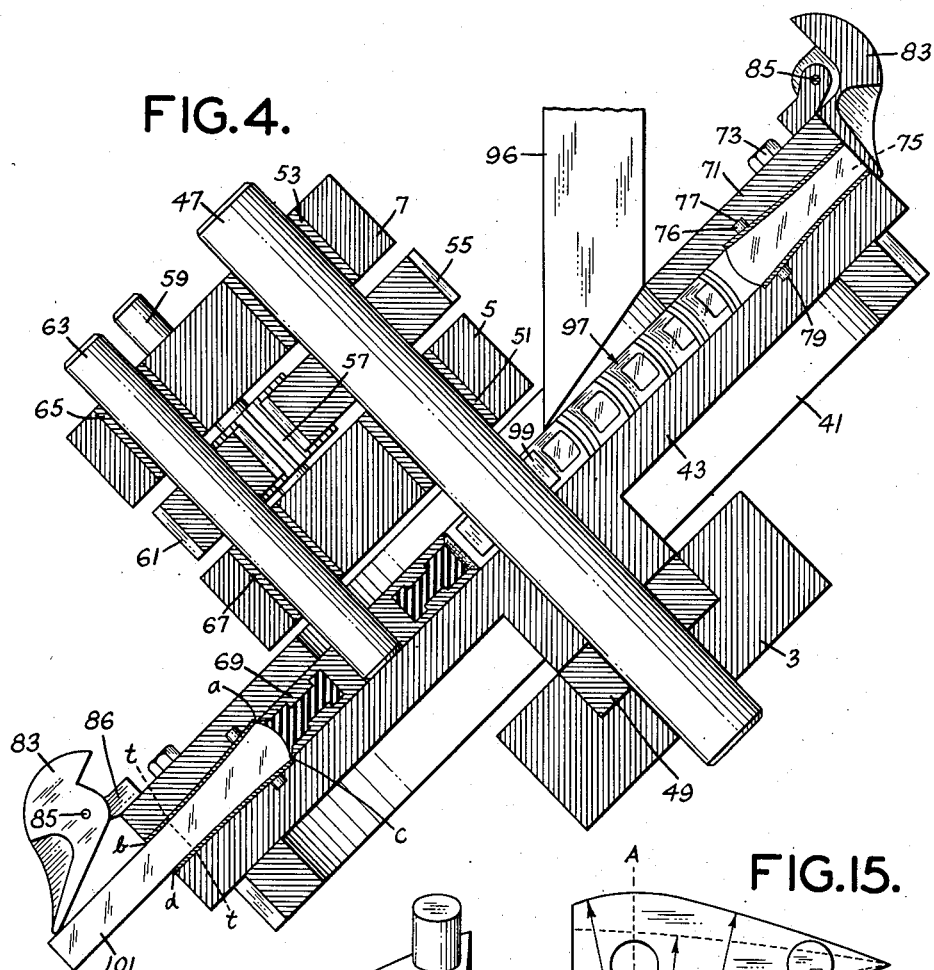
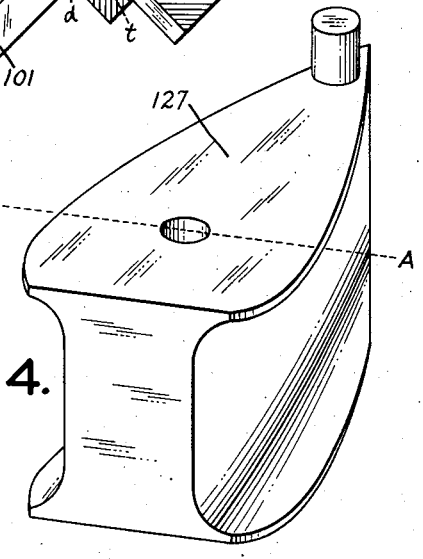
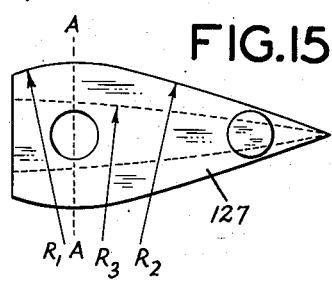
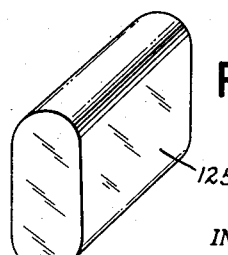
INVENTOR.
CROSBY FIELD
BY
Curtis, Morris & Safford
ATTORNEYS.

July 28, 1953  C. FIELD  2,646,594
EXTRUSION APPARATUS AND METHOD
Filed Dec. 31, 1948  8 Sheets-Sheet 4

INVENTOR.
CROSBY FIELD
BY
Curtis, Morris & Safford
ATTORNEYS.

July 28, 1953　　　　　C. FIELD　　　　　2,646,594
EXTRUSION APPARATUS AND METHOD
Filed Dec. 31, 1948　　　　　　　　　　　　8 Sheets-Sheet 5

INVENTOR.
CROSBY FIELD
BY
Curtis, Morris & Safford
ATTORNEYS.

July 28, 1953          C. FIELD          2,646,594
EXTRUSION APPARATUS AND METHOD
Filed Dec. 31, 1948          8 Sheets-Sheet 6
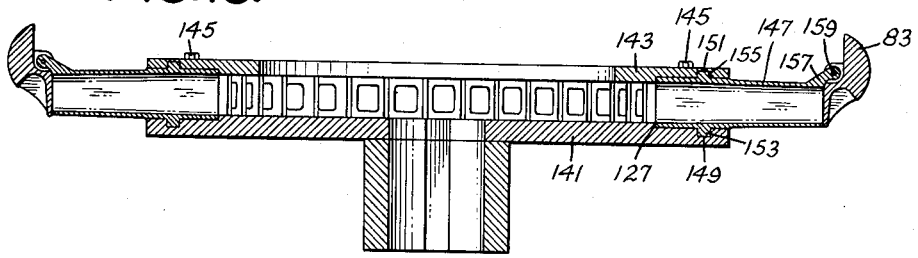
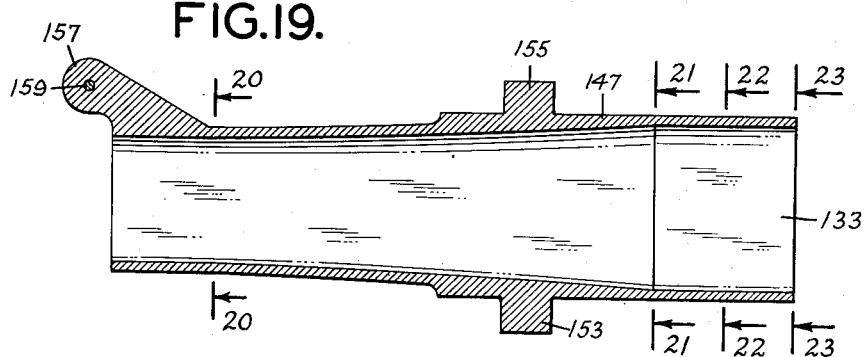
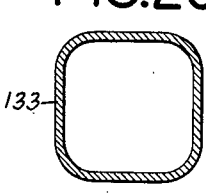 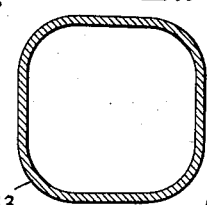 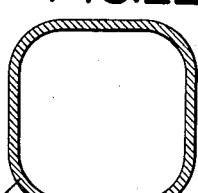 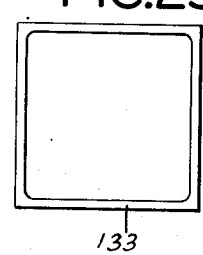
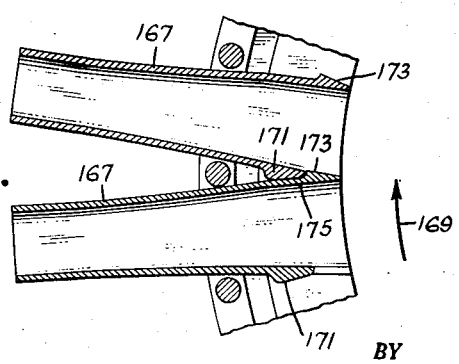
INVENTOR.
CROSBY FIELD
BY
Curtis, Morris & Safford
ATTORNEYS.

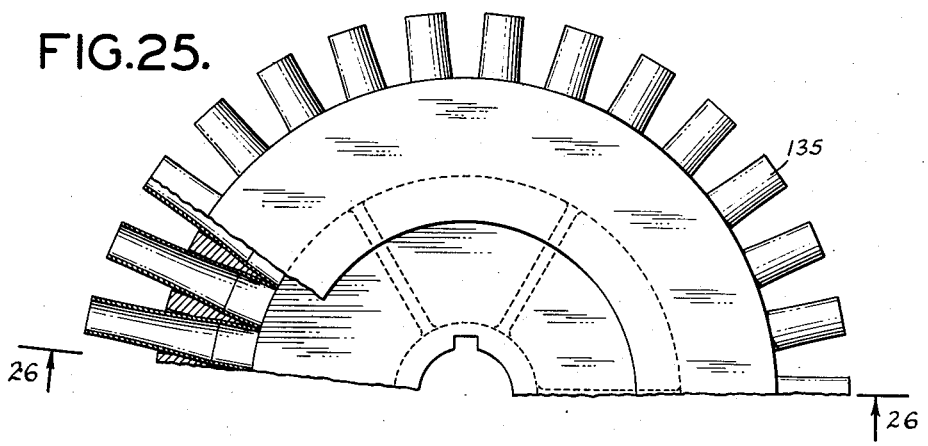
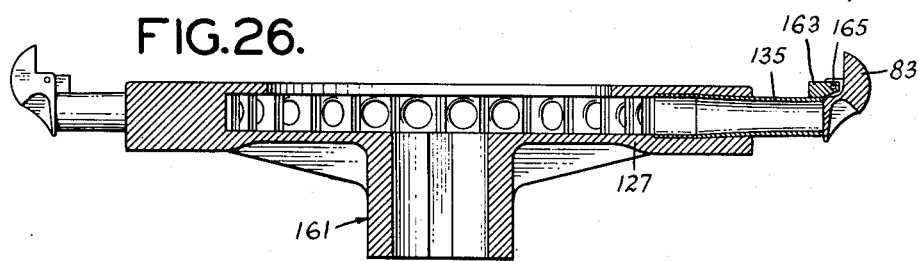
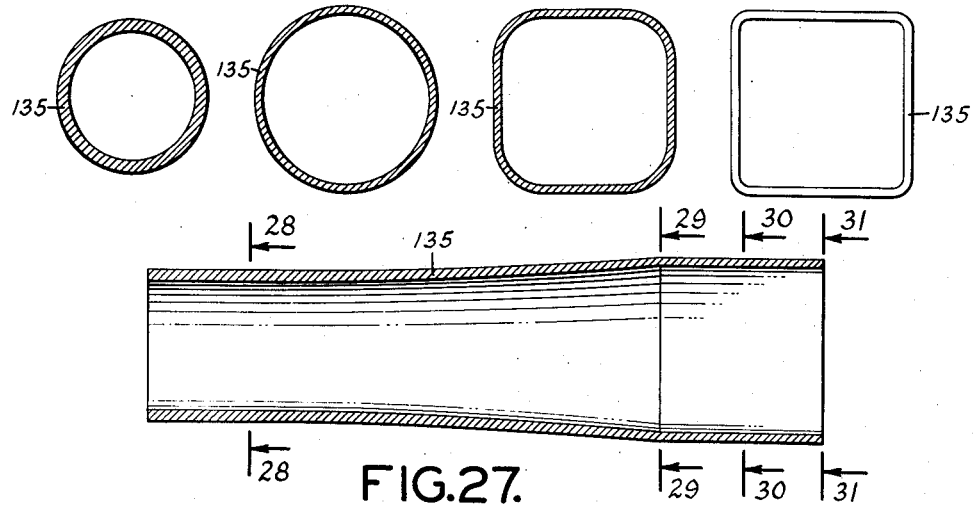

July 28, 1953  C. FIELD  2,646,594
EXTRUSION APPARATUS AND METHOD
Filed Dec. 31, 1948  8 Sheets-Sheet 8

INVENTOR.
CROSBY FIELD
BY
Curtis, Morris & Safford
ATTORNEYS.

Patented July 28, 1953

2,646,594

UNITED STATES PATENT OFFICE 2,646,594

EXTRUSION APPARATUS AND METHOD

Crosby Field, Brooklyn, N. Y., assignor to Flakice Corporation, Brooklyn, N. Y., a corporation of Delaware Application December 31, 1948, Serial No. 68,712

19 Claims. (Cl. 18—12)

This invention relates to methods of and apparatus for converting particles or fragments of frozen fluid, and the like, into a solid mass; more particularly it pertains to methods and apparatus for pressing such fragments into a solid, homogeneous rod or bar having appreciable mechanical strength. It is related to the invention described and claimed in my United States Patent No. 2,427,644 issued September 16, 1947. I am aware that there have been numerous developments for compacting or briquetting products, including frozen products such as ice. My invention, described herein, is of that class wherein the compression is carried out upon the product as it progresses continuously through the machine. This type of compression is frequently referred to as extrusion.

For purposes of illustration the invention is described in some detail and with some alternate variations as embodied in a particular machine for extruding rods of ice using a supply of ice fragments. Other embodiments and applications of the invention will, of course, occur to those skilled in the art after they are acquainted with the construction and working of the particular machine and variations described hereinafter.

I have found that ice made in the form of rod pieces, each of a length one or more times its transverse width, is particularly well adapted for packing certain perishable food stuffs and for use in refrigerator car bunkers and the like. Such rod pieces when frozen hard can be stored under refrigeration and handled in much the same fashion as hard coal. In accordance with my invention I produce rod pieces of this general type which I shall call hereinafter by the term "extrods."

It is an object of my invention to provide extrusion methods and apparatus of the character described having to a notable extent the characteristics and capabilities set forth. Another object is to produce improved methods and apparatus which overcome certain of the disadvantages inherent in the constructions and operations of the prior art. A further objective resides in the provision of improved methods and apparatus for carrying out the manufacture of solid ice masses from ice particles or fragments utilizing a converging nozzle action. A further object is to provide relatively inexpensive and commercially feasible apparatus for manufacturing solid ice from thin broken sheets of ice such as is produced by the methods and machines disclosed and claimed in Crosby Field Patent No. 2,005,733 issued June 25, 1935, Crosby Field Patent No. 2,005,734 issued June 25, 1935, Frank Short Patent No. 2,303,664 issued December 1, 1942, Frank Short Patent No. 2,310,468 issued February 9, 1943, and Francis M. Raver Patent No. 2,308,541 issued January 19, 1943. It is a further object of my invention to provide a machine in which all parts move in one direction continuously, as distinguished from such machines as described and claimed in Crosby Field Patent No. 2,425,237 issued August 5, 1947. A still further object is to provide in the compression system of an extruder a resilient member such that the pressure on ice being compacted may be uniformly distributed, thus to prevent the breaking off of pieces at the entrance to the nozzle as often occurs when there is no resilient member present. Yet another object of this invention is to provide a machine wherein the forward motion of the product being compacted into the nozzle shall be by gravity. Another object is to provide a machine of large capacity, of relatively small size, and which can be adapted with only slight modification to a wide variety of products. Other objects will in part be pointed out as the description proceeds and will in part become apparent therefrom.

The invention accordingly consists of the features of construction, combinations of elements, methods of operation and arrangements of part as will be exemplified in the structure and sequences and groups of related steps to be hereinafter described and the scope of the application of which will be set forth in the accompanying claims.

In this specification and the accompanying drawings I have shown and described a preferred embodiment of my invention and suggested various modifications thereof; but it is to be understood that these are not intended to be exhaustive nor limiting of the invention but, on the contrary, are given for purposes of illustration in order that others skilled in the art may fully understand the invention and the principles thereof and the manner of applying it in various forms, each as may be best suited to the conditions of a particular use.

In the drawings:

Figure 2 is substantially a rear view of the machine;

Figure 4 is a partial section along the line

Figure 1:
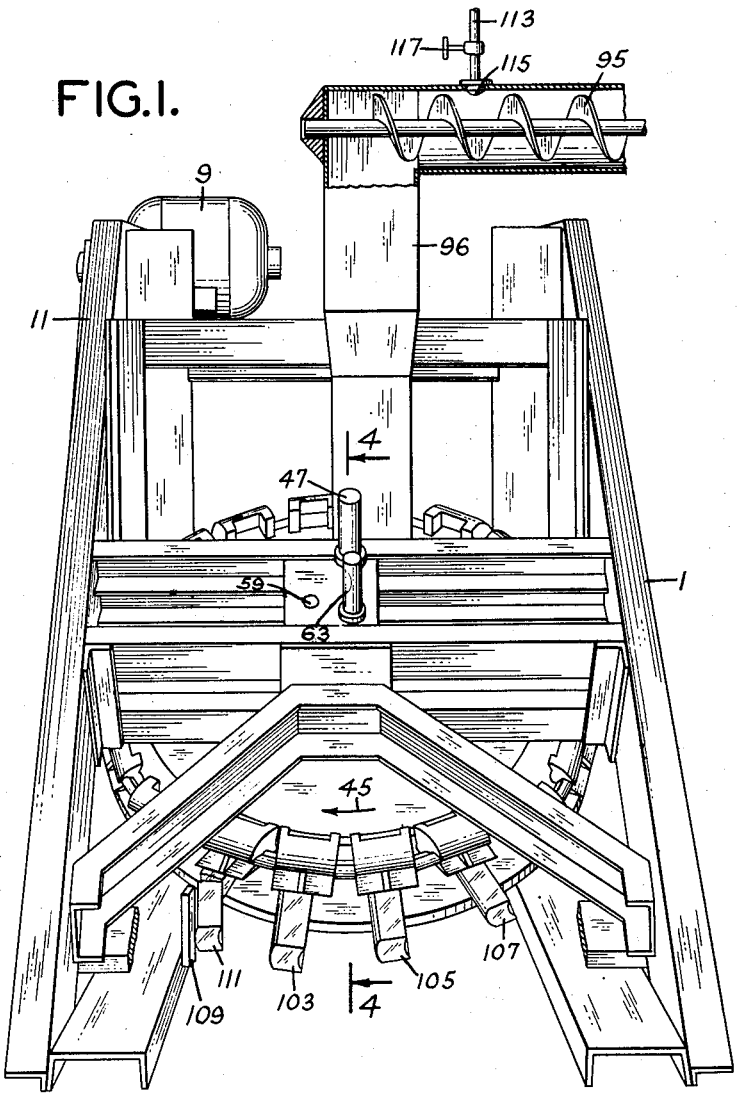
Figure 1 is a front view of the machine.
Figure 3:
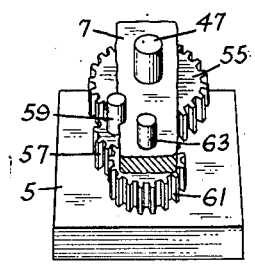
Figure 3 is a fragmentary perspective view with parts broken away of a portion of the machine shown in Figure 1.
Figure 5:
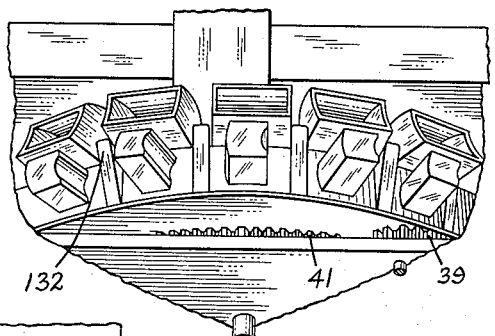
Figure 6:
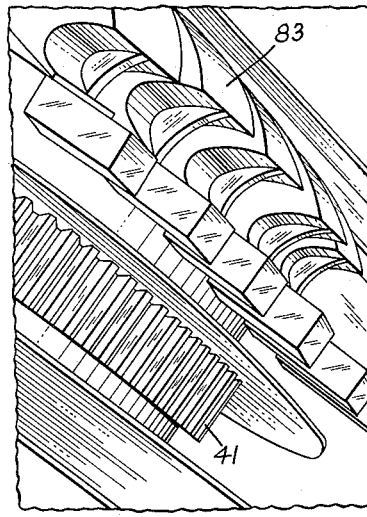
Figure 32:
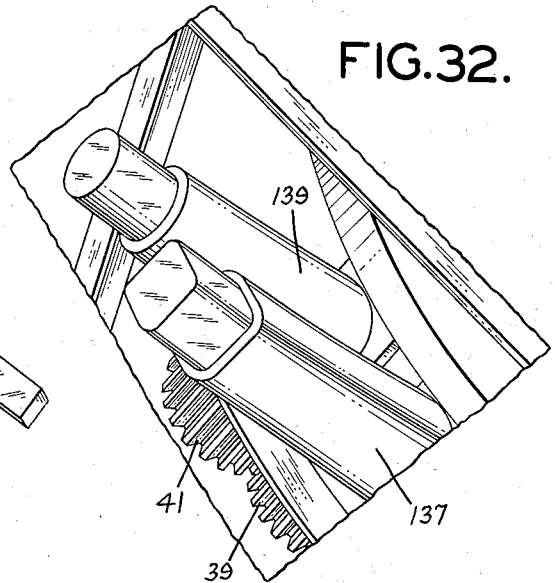
Figure 10:
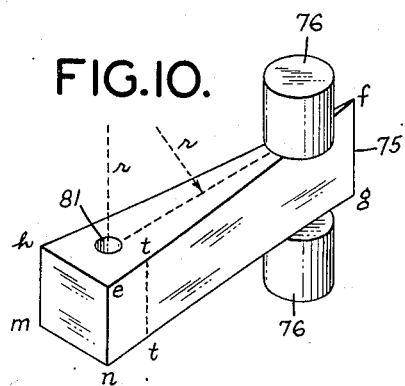
Figure 9:
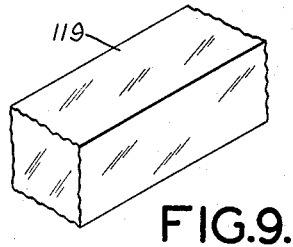
Figure 16:
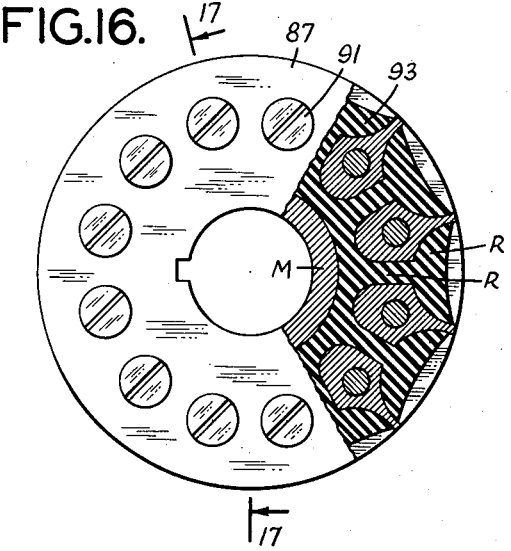
Figure 17:
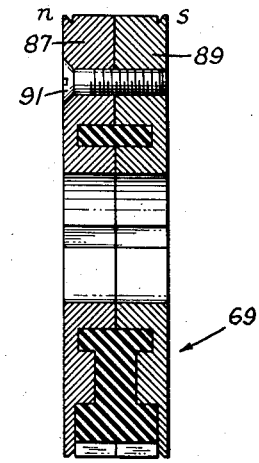
Figure 7:
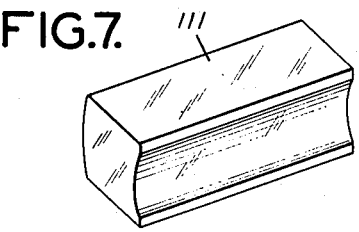
Figure 11:
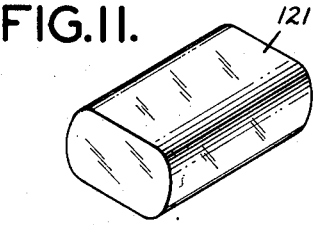
Figure 8:
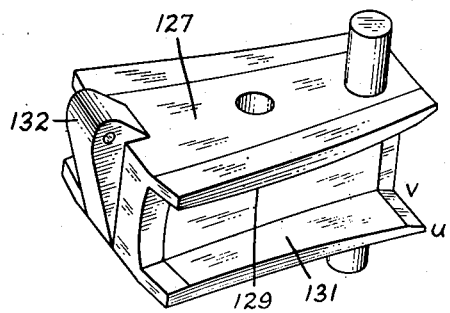
Figure 12:
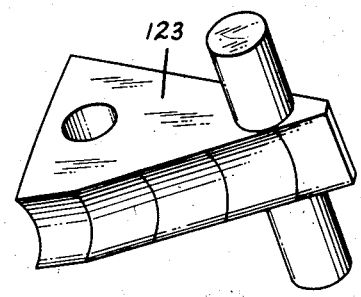
Figure 33:
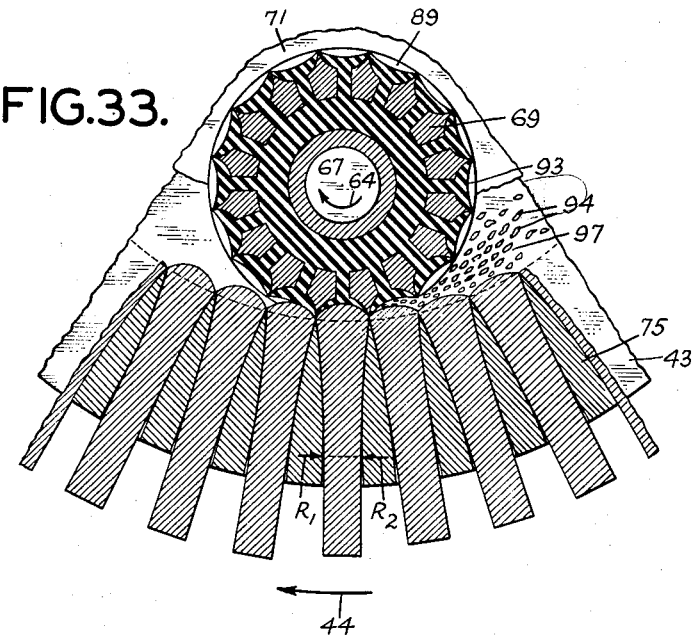
Figure 34:
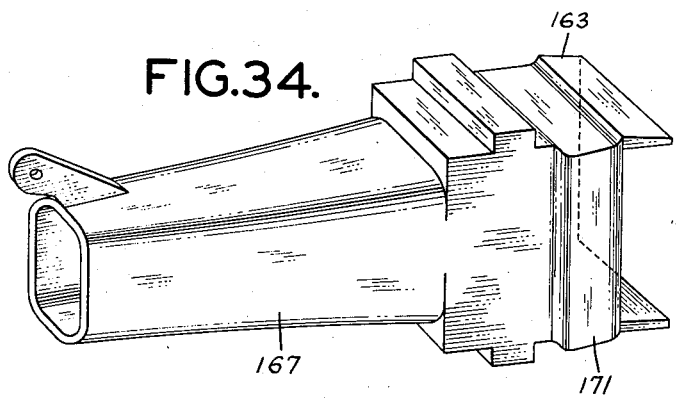

4—4 of Figure 1 through the rotor assembly, to be described, but showing a different converging nozzle;

Figure 5 is a fragmentary view of a part of a rotor showing several converging nozzles from which are issuing another of the varieties of extrods, as will be described more fully hereinafter;

Figure 6 is another partial view of the rotor showing the same modification of nozzle as Figure 4;

Figure 7 is a view of an extrod made by the rotor shown in Figure 5;

Figure 8 is a form of half-nozzle or wedge which, when assembled with other such wedges between two plates to form a rotor, as indicated in Figure 5, will produce an extrod as shown in Figure 7;

Figure 9 is a view of an extrod made by the rotor shown in Figure 6;

Figure 10 is another form of wedge which, when assembled with other similar wedges between two plates to form a rotor, as shown in Figure 6, produces the extrod shown in Figure 9;

Figure 11 is another form of extrod;

Figure 12 is a half-nozzle or wedge for forming an extrod such as shown in Figure 11;

Figure 13 is another form of extrod;

Figure 14 is a view of a wedge which, when assembled with other wedges between plates to form a rotor, will produce an extrod such as shown in Figure 13;

Figure 15 is a top view of the wedge shown in Figure 14;

Figure 16 is a view of one form of compressor or pocket wheel;

Figure 17 is a vertical section along the line 17—17 of Figure 16;

Figure 18 is a longitudinal section of a modified rotor subassembly showing another embodiment of my invention;

Figure 19 is a vertical section, at approximately full scale, through a nozzle designed to fit the rotor shown in Figure 18;

Figure 20 is a vertical section along the line 20—20 of Figure 19;

Figure 21 is a vertical section of the line 21—21 of Figure 19;

Figure 22 is a vertical section along the line 22—22 of Figure 19;

Figure 23 is an end view along the line 23—23 of Figure 19;

Figure 24 is a partial horizontal section through a rotor similar to the one shown in Figure 18;

Figure 25 shows a fragmentary plan view, with parts broken away, of still another form of rotor embodying my invention;

Figure 26 is a vertical section along the line 26—26 of Figure 25;

Figure 27 is a longitudinal section, at approximately full scale, of one of the nozzles shown in Figures 25 and 26;

Figure 28 is a vertical section along the line 28—28 of Figure 27;

Figure 29 is a vertical section along the line 29—29 of Figure 27;

Figure 30 is a vertical section along the line 30—30 of Figure 27;

Figure 31 is an end view along the line 31—31 of Figure 27;

Figure 32 is a partial view of a rotor producing two varieties of extrods, one of a circular cross-sectional shape and the other square with rounded edges;

Figure 33 is a sectional view showing for one embodiment the formation of extrods and the feed of the ice; and Figure 34 is a perspective view of the nozzle shown in Figure 24 indicating the reinforcing construction around the sides of the mouth.

In Figures 1, 2, 3 and 4, it will be noted that the first illustrative form comprises a frame 1 of suitable size and shape to support bearing blocks 3, 5, and 7 (see Figure 4), together with a motor 9 and such other parts as will be described more fully hereinbelow. By means of a V-belt 11 (see Figure 2) power is transmitted from the motor to a pulley 13 driving a shaft 15 properly supported in bearings 17 and 17a. At the other end of shaft 15 is a pinion 19 which meshes with a gear 21 driving a shaft 23 properly supported in bearing blocks 25 and 27. Shaft 23 carries a bevel pinion 29 meshing with a bevel gear 31 driving a shaft 33 properly supported in bearings 35 and 37 attached to frame 1. The other end of shaft 33 carries a pinion 39 which meshes with a ring gear 41 rigidly attached to one side of a rotor plate 43 by which means the motor causes rotor plate 43 to rotate in the direction of arrow 45.

Rotor 43 has keyed to it a shaft 47 (see Figure 4) supported in bearing blocks 3, 5 and 7, its weight being carried by a thrust bearing 49 in bearing block 3 and antifriction bushings 51 and 53 in bearing blocks 5 and 7, respectively. Shaft 47 carries with it a spur gear 55 (see Figures 3 and 4) which meshes with an idler 57 carried on a shaft 59 supported in bearing blocks 5 and 7. Pinion 57 in turn meshes with a pinion 61 carried on a shaft 63 rotating in bushings 65 and 67, respectively, in bearing blocks 7 and 5. At the bottom of shaft 67 is attached a pocket wheel 69, shown in more detail in Figures 16 and 17, and described more fully hereinbelow.

As shown in Figure 4, a ring plate 71 is attached to rotor plate 43 by means of cap screws 73. Shaped spacers or wedges 75, one of which is shown in more detail in Figure 10, are inserted between plates 43 and 71 to define between each two adjacent wedges an accurately shaped nozzle for the compression of the ice, as will be described more fully hereinafter.

It will be noted that lugs 76 on wedges 75 fit into holes 77 and 79 in plates 71 and 43, respectively, and in addition cap screws 73, passing through holes 81 in wedges 75, make the assembled structure substantial and able to resist the large forces generated during compression of ice.

As shown in Figure 4, the surfaces $ab$ and $cd$ of plates 71 and 43 are curved, having a narrow point at the section $t$—$t$ which forms the throat of the nozzle. The cross-sectional dimensions of the final extrod are determined by the section at $t$—$t$. Any wedges inserted (see wedge 75 of Figure 10) should have their top and bottom surfaces configured to the same curves $r$ as the curves $ab$ and $cd$ shown in Figure 4 and with the narrowest section at $t$—$t$. Similarly the curves of the surfaces $efgn$ and $hfgm$ of the wedge should be correspondingly configured.

I have found by experiment that the best results are obtained when a chord (see Figure 10) from the point $fg$ of the wedge to the throttle point $t$—$t$ is at a slope the tangent of which does not exceed .05. The center of a circle of which a radius $r$ describes an arc on the surfaces $hfe$ and $mgn$ should be on a line drawn perpendicular to the surface at the section $t$—$t$.

The center of a radius $R_1$, $R_2$, etc. (see also Figure 33) describing a curved surface $efgn$ or

*hfgm* should be on a line perpendicular to the center line of the nozzle and erected at the point of intersection of such center line with a line joining the lines *t—t* of the two adjacent wedges 75.

As shown in Figure 4, plate 71 carries over each nozzle outlet a flapper 83 free to turn about a pivot pin 85 carried by a boss 86 on plate 71. The purpose of these flappers will be more particularly described hereinbelow.

In Figures 16 and 17 it will be noted that pocket wheel 69 comprises an upper flange 87 attached to a bottom flange 89 by means of cap screws 91. Flanges 87 and 89 are configured so as to grasp firmly a shaped ring of rubber 93. The size and shape of the rotor subassembly and of pocket wheel 69 is such as to present an open pocket of rubber to each nozzle mouth as the rotor and wheel rotate under the influence of motor 9. The arrangement is such that an edge, such as *ns* of Figure 17, meets an edge of a nozzle, such as *fg* of wedge 75 in Figure 10, as each passes the lowest point of its rotation as shown in Figures 1, 2, 4 and 33. This aligned meeting of edges *ns* and *fg* is insured by a proper ratio of nozzles and of pockets in the rotor and the pocket wheel, respectively, and the same ratio in the number of teeth in gear 55 and pinion 61 (see Figures 3 and 4).

The operation of the compacting or extruding then is as follows (see Figures 1, 2, 4 and 33): small particles of ice or other congealed fluid 94 are fed from a storage bin by means of a screw conveyor 95, driven at a speed such that the amount of the product fed shall be somewhat less than the capacity of the extruder, to a chute 96 directing the small fragments into the annular space 97 formed between plate 71 and shaft 47. In order to prevent jamming of the ice in this space I provide (see Figure 4) a series of small vanes 99 attached to shaft 47 which, as the shaft rotates, will dislodge any particles tending to jam and will promote an even ice flow from the chute exit and between plates 71 and 43. Because of the angle with the horizontal at which the rotor is revolving, ice particles fall between the ring and rotor plates and downwardly around the pocket wheel, as shown more fully in Figure 33. Continued rotation of shaft 63 in the direction of arrow 64, and of rotor plate 43 in the direction of arrow 44, carries ice particles into the nozzle entrances where it is compressed by the cushioning action of rubber ring 93.

Upon putting a machine into operation there is no ice in the nozzles, consequently any ice pushed into the nozzles as just described would meet with no resistance and would simply run out of the outlet end. In order to prevent this, I have provided for each nozzle a flapper 83, as pointed out above, the weight of which is so disposed about its pin 85 that the flapper normally closes the outlet of the nozzle and offers enough resistance that the ice begins to form an extrod within the nozzle under the impulse of the pocket wheel 69, as just described.

When an extrod has been built up solidly within the nozzle continued operation causes it to move out of the nozzle, pushing the flapper out of its way about flapper pivot 85. The result is as shown in Figures 1, 5, 6, and 33. When in the open position, as shown at the left in Figure 4, the weight of the flapper 83 is so distributed as to bear very lightly on the top of the extrod 101, but should the extrod be broken or should the machine be shut down so as to melt the ice, then the weight of the flapper would be sufficient to close the nozzle. The force required from a flapper in order to begin building up an extrod is not large; it need merely be sufficient to promote the normal jamming action of the converging walls of the nozzle and to prevent loose ice particles from running freely through without establishing the jamming action upon which normal extrusion depends.

At each further rotation of the rotor, as each nozzle passes its lowest point under the pocket wheel, its extrod is pushed farther out, as shown in Figure 1 by extrod 103 in comparison with extrods 105 and 107. When an extrod has reached a predetermined length, it strikes breakrod 109 giving a complete extrod 111 which then falls into a chute or storage bin for further use.

I have found that ice to be extruded varies considerably in the amount of moisture it contains or in its degree of subcooling and, in order to obtain consistently uniform extrods, I provide in conveyor 95 a pipe 113 with spray nozzles 115 and control valve 117 so that the quality of the ice fed to the extruder may be maintained substantially uniform. As is well known, the freezing temperature of water varies according to an inverse relationship with the pressure on the water. The pressure built up within a nozzle will tend to melt some of the ice; the resulting water will, of course, recongeal upon being released from compression. This phenomenon aids in producing good quality extrods. In order to maintain optimum extruding conditions, however, it is often desirable to add water through pipe 113 when the incoming ice has been subcooled beyond the point where the extrusion pressure alone will produce enough water to bind the particles into a homogenous extrod. The ice fragments supplied often will be in a dry stage at a temperature of 0° Fahrenheit or even lower, depending upon manufacturing or storage conditions. By nicely balancing the amount of water added a uniform product of hard, homogenous extrods may be produced.

It will be noted that extrod 119 shown in Figure 9, produced by wedges like wedge 75 of Figure 10, as shown in Figure 6, is square in section with sharp corners. This extrod works extremely well in certain applications. It is frequently desired, however, to have extrods of different shapes, such as those shown in Figures 7, 11 and 13.

To produce extrod 121 shown in Figure 11 I merely modify the wedge of Figure 10, as shown by wedge 123 in Figure 12, using the same ring and rotor plates 71 and 43 as shown in Figure 4. Because the cross section is no longer rectangular, compression is not uniform and the extrod is not as firm and strong uniformly throughout as is extrod 119 shown in Figure 9. This lack of strength can be rectified by lengthening the nozzle and reproportioning the parts, as will be described more fully hereinafter.

Another extrod 125 (see Figure 13) of somewhat similar shape can be produced by opening the distance between ring and rotor plates 71 and 43 and substituting wedges one of which is shown at 127 in Figures 14 and 15. The resulting extrod 125 is a good commercial product but, again, it is not as strong as extrod 119 shown in Figure 9, and for the same reasons that extrod 121 (see Figure 11) was not as strong.

Again, it may be desirable to have each extrod formed to such curved surfaces that an air flow through a random pile of the extrods is always obtainable. One method of doing this is by utilizing wedges 127, shown in Figure 8, to produce extrod 111 shown in Figures 1 and 7. It will be noticed that for the first time, wedges 127 (see Figure 8) have shaped top and bottom curved surfaces 129 and 131 as well as the shaped side surfaces as heretofore brought out. The shaped top and bottom surfaces 129 and 131 duplicate the curves of the curved surfaces of plates 71 and 43 of Figure 4, already described. Because of this, wedges 127 can be made longer, complying throughout with the requirements for the tangent of the chord of the curved surface above given, and will produce substantially the same quality of extrod. The requirements for curvature of these surfaces are the same as described in relation to Figure 10 and as shown more fully in Figure 33. Each wedge 127 is provided with a lug 132 forming a support for the pivot pin of a flapper.

In using wedges as shown in Figure 8, it will be noted that it is necessary to undercut the surfaces of plates 71 and 43 in a fashion similar to that shown in Figure 18 at 127 in order to prevent the building up of an ice ring due to pressure between the edges of the steel flanges of the pocket wheel and the edges $uv$ of the wedge shown in Figure 8.

I have found that in order to supply the best extrods the arc of convergence on all sides of the extrod-forming nozzle should have the same radius of curvature and the same chordal tangent and furthermore the degree of compression should be such that the cross sectional area of the finished product should be less than 60 per cent of the area at the mouth of the nozzle. I have also found that it is preferable during compression to have the curved surfaces of the nozzle so arranged that at any point along the longitudinal axis of the nozzle the change in distance from the longitudinal axis to any surface through any small increment of longitudinal advance shall be the same, otherwise streaking or stress lines may appear. A good extrod, free of streaks or stress lines, has greater commercial appeal than streaked or cloudy extrods.

The shapes of the ring and rotor plates and of the pocket wheel are such as normally to make the shape of the mouths of the nozzles rectangular or square; the most efficient construction for this type of machine will have a square shape. To maintain the requirements already set forth and to begin with a square nozzle mouth and end with a round or other shape nozzle outlet provides a problem which I have successfully solved by means of nozzle 133 shown in Figures 19 to 23 inclusive, nozzle 135 shown in Figures 27 to 31 inclusive, and nozzles 137 and 139 shown in Figure 32.

In this type of nozzle I first transform from the shape of the mouth (see Figures 23 and 31), employing a minimum of convergence of side walls in effecting the change, to the desired correct sectional shape (see Figures 21 and 29) and then compress the product by converging the sides uniformly to the finished shape and size (Figures 20 and 28) following the rules laid down hereinbefore.

In Figure 18 I show another embodiment of the rotor of my invention comprising essentially a bottom plate 141 and a top plate 143 held together by cap screws 145. Between these two plates is supported a nozzle 147 of the shape shown in Figure 19, the plates 141 and 143 being notched out as at 149 and 151 to receive lugs 153 and 155, respectively. Nozzle 147 carries a lug 157 to receive a pin 159 on which a flapper is carried.

In Figures 25 to 31 inclusive I show still another embodiment of my invention in which nozzle 135, shown in Figure 27, is upset from a tube while hot to form the nozzle shown. Nozzles 135 are then placed in a mold and cast into rotor 161, which thus has the equivalent of the top and bottom plates both cast simultaneously and integrally. After the casting is finished lugs 163 are welded onto the nozzles to provide support for pins 165 on which flappers can pivot.

As illustrated more particularly in Figure 24, it will be noted that nozzles 167 shown therein are strengthened to provide greater resistance against pressure as the rotor rotates in the direction of arrow 169. This reinforcing is produced by strengthening one side of the nozzle, as shown by lug 171, and carrying the side of the coacting adjacent nozzle into the mouth of the first nozzle by means of a lug 173, thus providing a thicker wall 175 against which lug 171 may bear and shaped to receive the same. In Figure 34 nozzle 167 is shown in more detail.

With reference to undercut 127 shown in Figures 18 and 26, I have found it advantageous to configure the parts so as to obtain a shallow ledge, or surface, against which the surface of the formed ice in the nozzle will tend to rest at its high point of revolution thus preventing radially centerward movement of the extrods as the nozzles approach and pass over their high points in the rotation of the rotors about an angularly placed shaft axis.

From the foregoing it will be observed that extrusion apparatuses and methods embodying my invention are well adapted to attain the ends and objects hereinbefore set forth and to be economically put into commercial use since both the methods and the various apparatuses are well suited to employment along with common production methods and are susceptible to a wide latitude of variations as may be desirable in adapting the invention to different applications.

I claim:

1. In the art of extruding a quantity of ice particles to form a solid, homogeneous rod-like piece of ice, that improvement which includes the steps of: establishing a flowing stream of particles having a central longitudinal axis extending substantially in a straight line, and constraining the width and height of such stream to cause it to flow within smoothly converging arcuate lines the chords of which, when drawn between the beginning of the stream and the point of minimum cross section, define a chordal angle with said longitudinal axis of tangent not greater than .05.

2. The invention of claim 1 which also includes the step of constraining the area of minimum cross section of the stream to less than 60 per cent of the area of cross section at the beginning of the stream.

3. In the art of producing an extrod of substantially craze-free ice of predetermined irregular cross-sectional shape, that improvement which includes the steps of: establishing a flowing ice-particle stream of the predetermined irregular shape at its outlet and of substantially rectangular shape and at least 1⅔ greater cross-sectional area at its beginning, and first constraining the width and height of such stream to convert it gradually from rectangular cross section to a cross section of the predetermined shape and of area no greater than and not substantially less than that of the rectangular cross section, and thereafter constraining the stream to maintain the predetermined shape while smoothly reducing its cross section to the area at the outlet.

4. An extruder subassembly for a machine for extruding a quantity of particles of a product to form solid, homogeneous rod-like pieces, said subassembly including: a rotor plate, a coaxial ring plate spaced from said rotor plate, and a plurality of replaceable wedges disposed radially between peripheral portions of said plates; each pair of adjacent wedges together with overlying and underlying plate portions defining a nozzle-like converging extrusion channel therebetween.

5. An extruder subassembly for a machine for extruding a quantity of particles of a product to form solid, homogeneous rod-like pieces, said subassembly including: a rotor, and a plurality of nozzle elements radially disposed around peripheral portions of said rotor; said nozzle elements together defining a plurality of radially-extending extrusion channels.

6. The invention of claim 5 wherein said rotor is supported for rotation upon a central shaft and contains an annular chamber surrounding said shaft and lying inside of the peripheral portions wherein said nozzle elements are disposed; said annular chamber forming a particle-receiving space from which to feed particles to said extrusion channels.

7. An extruder assembly for a machine for extruding a quantity of particles of a product to form solid, homogeneous rod-like pieces, said assembly including: a base member constituting an extrusion bed and presenting a rotor surface; a plurality of evenly spaced, regularly oriented extrusion channels defined within said bed and each having an inlet mouth opening out of said rotor surface; a pocket wheel constrained to rolling movement with respect to said rotor surface; said wheel comprising a plurality of evenly spaced compression pockets extending therearound; the shape of each pocket corresponding to the shape of the mouth of each extrusion channel; and said wheel and bed being positively coupled together with said pockets in coincidence with said mouths.

8. An extruder assembly for a machine for extruding a quantity of particles of a product to form solid, homogeneous rod-like pieces, said assembly including: a base member constituting an extrusion bed and presenting a rotor surface; a plurality of evenly spaced, regularly oriented extrusion channels defined within said bed and each having an inlet mouth opening out of said rotor surface; a pocket wheel constrained to rolling movement with respect to said rotor surface; said wheel comprising a plurality of evenly spaced compression pockets extending therearound; each pocket constituting a recess defined at least in part by the surface of a rubber-like medium; and said wheel and bed being positively coupled together with said pockets in coincidence with said mouths.

9. An extruder assembly for a machine for extruding a quantity of particles of a product to form solid, homogeneous rod-like pieces, said assembly including: a rotor mounted for rotation about a fixed axis and in a plane intermediate the horizontal and the vertical; a plurality of evenly spaced, radially extending extrusion channels defined within peripheral portions of said rotor; an annular space within the confines of the peripheral portions of said rotor and on the side thereof facing the vertical; a product supply chute leading downwardly to said annular space from above; a rotor shaft extending perpendicularly from the center of said rotor; and a plurality of particle-dislodging vanes extending radially from around the base of said shaft and operating within said annular space.

10. An extruder assembly for a machine for extruding a quantity of particles of a product to form solid, homogeneous rod-like pieces, said assembly including: a rotor mounted for rotation about a fixed axis and in a plane intermediate the horizontal and the vertical; a plurality of evenly spaced, radially extending extrusion channels defined within peripheral portions of said rotor; an annular space within the confines of the peripheral portions of said rotor and on the side thereof facing the vertical; a product supply chute leading downwardly to said annular space from above; a pocket wheel within said annular space mounted for rolling movement with respect to the peripheral portions of said rotor; and the point of rolling contact between said wheel and rotor being below the level of the point of discharge of said chute.

11. An extruder assembly for a machine for extruding a quantity of particles of a product to form solid, homogeneous rod-like pieces, said assembly including: a base member constituting an extrusion bed, an extrusion channel defined within said bed and extending between an inlet mouth and an outlet opening, and a flapper pivotally mounted on said bed adjacent said opening; said flapper incorporating a closure-like portion adapted in one position of the flapper about its pivot axis to cover said opening, said flapper further incorporating a biasing portion movable about the pivot axis from a position of maximum effectiveness remote from a vertical plane through the pivot axis to a position of minimum effectiveness nearly on a vertical plane through the pivot axis, and said biasing portion having maximum effectiveness when said closure-like portion covers said opening.

12. An extrusion nozzle and a flapper pivotally mounted adjacent the discharge opening of said nozzle; said flapper being pivotally movable through about 90 degrees from closed position to open position, said flapper including a closure portion adapted to cover said opening when said flapper is in closed position, and said flapper further including a biasing portion which causes said closure to bear firmly against said opening when said flapper is in closed position.

13. An extrusion nozzle having an inlet mouth, the opening of said mouth being substantially rectangular, said mouth being reinforced across one side and relieved across the opposite side to define a mouth edge located nearer the outlet end of the nozzle than the corresponding mouth edge of said one side, and said opposite side being reinforced adjacent said relieved mouth edge.

14. A rotary extruder incorporating a plurality of juxtaposed, radially extending nozzle elements, each element defining a rectangularly shaped nozzle mouth reinforced across one side and relieved across the opposite side to define a mouth edge located nearer the outlet end of the nozzle than the corresponding mouth edge of said one side, the reinforced side of each nozzle element being abutted against the relieved mouth edge of an adjacent element, the reinforced side of each nozzle element thus filling in the space resulting from the relieved portion in an adjacent nozzle element, and the opposite side of each nozzle element being reinforced adjacent its relieved portion and supporting the reinforced side of an adjacent nozzle element.

15. An ice extrusion nozzle for extruding ice particles in the form of a substantially craze-free solid rod of ice, said nozzle having side walls defining an extrusion channel of substantially straight central longitudinal axis, said walls extending between an inlet mouth of maximum cross section and a throat of minimum cross section not greater than 60 per cent of the cross section of the mouth, said walls converging arcuately, and a chord of the arc of convergence drawn between a point at the mouth and a corresponding point at the throat making a tangent of not greater than .05 with the longitudinal axis.

16. An extrusion nozzle having side walls defining an extrusion channel having an inlet mouth substantially rectangular in cross section and a throat of predetermined nonrectangular cross section and not more than 60 per cent of the cross-sectional area of the mouth; said extrusion channel including a first portion of substantially constant cross-sectional area changing in shape from rectangular at the mouth to a cross section similar to said predetermined nonrectangular cross section, and a second portion extending from the end of said first portion to said throat and in which said predetermined nonrectangular cross section is maintained while the side walls converge.

17. An extruder assembly for a machine for extruding a quantity of particles of a product to form solid, homogeneous rod-like pieces, said assembly including: a rotor mounted for rotation about an axis; a plurality of evenly spaced, radially outwardly extending extrusion channels defined within peripheral portions of said rotor; an annular space within the confines of the peripheral portions of said rotor; a wall portion forming a substantially planar surface extending perpendicularly to the axis of rotation of said rotor and substantially sealing off said annular space across one side thereof; a substantially flat-sided pocket wheel within said annular space with its side substantially contiguous with the planar surface of said wall portion and mounted for rolling movement with respect to the peripheral portions of said rotor and about an axis parallel to the rotor axis; a ring gear coaxially integral with said rotor; a motor coupled in driving relationship with said ring gear; a rotor shaft keyed to said rotor and coaxial therewith; a pocket wheel shaft coaxial with said pocket wheel and keyed thereto; and a gear train coupling said shafts in driving relationship.

18. An extruder assembly for a machine for extruding a quantity of particles of a product to form solid homogeneous rod-like pieces, said assembly including: a rotor plate, a coaxial ring plate spaced from said rotor plate, a plurality of replaceable wedges disposed radially between peripheral portions of said plates, and tension elements holding said plates tightly together on said wedges; each of said plates having a peripheral extrusion surface facing the other plate, said wedges having top and bottom surfaces configured to interfit with said extrusion surfaces, each wedge having an extrusion surface on its opposite sides, and the facing extrusion surfaces of each pair of adjacent wedges together with the overlying and underlying plate extrusion surfaces defining an extrusion channel extending from an inner channel mouth to an outer channel throat.

19. An extruder pocket wheel for a machine for extruding a quantity of particles of a product to form solid, homogeneous rod-like pieces, said pocket wheel including: a substantially rigid disk-like body having side portions and a circumferentially extending peripheral portion therebetween, said peripheral portion comprising a series of evenly spaced pockets extending therearound, said disk-like body incorporating yieldable means, said pockets having substantially concave surface portions together forming at least part of the surface of said peripheral portion, said concave surface portions being defined at least in part by said yieldable means.

CROSBY FIELD.

References Cited in the file of this patent

UNITED STATES PATENTS

| Number | Name | Date |
|---|---|---|
| 729,149 | Penn | May 26, 1903 |
| 1,252,821 | Lewis | Jan. 8, 1918 |
| 1,700,208 | Paisseau | Jan. 29, 1929 |
| 1,804,283 | Sizer | May 5, 1931 |
| 1,816,572 | Largura | July 28, 1931 |
| 1,937,174 | Taylor | Nov. 28, 1933 |
| 2,178,009 | Helm | Oct. 31, 1939 |
| 2,245,608 | Rogers | June 17, 1941 |
| 2,303,664 | Short | Dec. 1, 1942 |
| 2,336,114 | Meakin | Dec. 7, 1943 |
| 2,405,272 | Smith | Aug. 6, 1946 |
| 2,425,237 | Field | Aug. 5, 1947 |
| 2,427,644 | Field | Sept. 16, 1947 |
| 2,431,278 | Raver | Nov. 18, 1947 |
| 2,451,986 | Slaughter | Oct. 19, 1948 |
| 2,457,088 | Pinney | Dec. 21, 1948 |